US009465766B1

(12) United States Patent
Knopp et al.

(10) Patent No.: US 9,465,766 B1
(45) Date of Patent: Oct. 11, 2016

(54) ISOLATION INTERFACE FOR MASTER-SLAVE COMMUNICATION PROTOCOLS

(71) Applicant: Xilinx, Inc., San Jose, CA (US)

(72) Inventors: Tomai Knopp, San Jose, CA (US); Sarosh I. Azad, Fremont, CA (US); Bhaarath Kumar, Fremont, CA (US)

(73) Assignee: XILINX, INC., San Jose, CA (US)

( * ) Notice: Subject to any disclaimer, the term of this patent is extended or adjusted under 35 U.S.C. 154(b) by 430 days.

(21) Appl. No.: 14/065,804

(22) Filed: Oct. 29, 2013

(51) Int. Cl.
*G06F 13/36* (2006.01)
*G06F 13/42* (2006.01)

(52) U.S. Cl.
CPC ..................................... *G06F 13/42* (2013.01)

(58) Field of Classification Search
USPC .................................................. 710/306, 110
See application file for complete search history.

(56) References Cited

U.S. PATENT DOCUMENTS

| | | | | |
|---|---|---|---|---|
| 4,209,840 A * | 6/1980 | Berardi | .................. | G06F 13/372 709/225 |
| 4,271,505 A * | 6/1981 | Menot | ..................... | G06F 13/37 370/400 |
| 4,396,978 A * | 8/1983 | Hammer | ................. | G06F 15/17 710/110 |
| 4,410,983 A * | 10/1983 | Cope | .................. | G05B 19/0428 370/449 |
| 4,837,788 A * | 6/1989 | Bird | ........................ | H04L 12/46 178/71.1 |
| 4,912,723 A * | 3/1990 | Verbanets, Jr. | ......... | G06F 11/10 340/9.1 |
| 5,003,465 A * | 3/1991 | Chisholm | ............... | G06F 13/28 710/25 |
| 5,109,333 A * | 4/1992 | Kubota | ............... | G06F 13/4217 712/34 |
| 5,386,567 A * | 1/1995 | Lien | ...................... | G06F 9/4411 710/302 |
| 5,461,723 A * | 10/1995 | Shah | ...................... | G06F 13/18 710/113 |
| 5,627,716 A * | 5/1997 | Lagree | ...................... | G06J 1/00 361/64 |
| 5,698,992 A | 12/1997 | El Ayat et al. | | |
| 5,754,865 A * | 5/1998 | Itskin | .................. | G06F 13/1663 709/227 |
| 6,073,195 A * | 6/2000 | Okada | .................. | G06F 1/3215 710/301 |
| 6,397,280 B1 * | 5/2002 | Nitschke | ............... | H04L 12/403 709/208 |
| 6,662,260 B1 * | 12/2003 | Wertheim | ........... | G06F 13/4022 710/316 |
| 6,715,068 B1 * | 3/2004 | Abe | ......................... | G06F 8/65 709/200 |
| 7,117,277 B2 * | 10/2006 | Mathewson | ........ | G06F 15/7867 710/52 |
| 7,185,175 B2 * | 2/2007 | Kravec | ............... | G06F 13/4027 712/11 |
| 7,234,011 B2 * | 6/2007 | Chae | ..................... | G06F 13/405 710/110 |
| 7,343,579 B2 | 3/2008 | Coxe et al. | | |
| 7,519,831 B2 | 4/2009 | LeQuere | | |
| 7,797,651 B1 | 9/2010 | Jacobson et al. | | |
| 7,949,974 B1 | 5/2011 | Moore et al. | | |
| 9,170,911 B1 * | 10/2015 | Atsatt | ................. | G06F 11/3041 |
| 9,213,617 B2 * | 12/2015 | Saito | ...................... | G06F 11/30 |

(Continued)

OTHER PUBLICATIONS

Specification and drawings for U.S. Appl. No. 12/364,030, filed Feb. 2, 2009, Peterson et al.

(Continued)

*Primary Examiner* — Paul R Myers
(74) *Attorney, Agent, or Firm* — LeRoy D. Maunu (57) ABSTRACT

An apparatus for communication using a master-slave communication protocol includes a master circuit and a slave circuit configured to communicate with each other using a master-slave communication protocol. The apparatus also includes an interface circuit coupled to the master and slave circuits. In response to a first control signal having a first value, the interface circuit forwards messages received from the master circuit to the slave circuit and forwards responses received from the slave circuit to the master circuit. In response to the first control signal having a second value, the interface circuit prevents messages received from the master circuit from being forwarded from the master circuit to the slave circuit.

18 Claims, 5 Drawing Sheets

(56) References Cited

U.S. PATENT DOCUMENTS

| | | | |
|---|---|---|---|
| 9,213,866 B1* | 12/2015 | Ahmad | G06F 21/76 |
| 2003/0158984 A1* | 8/2003 | Stuber | G06F 13/423 710/113 |
| 2004/0059852 A1* | 3/2004 | Sun | G06F 13/4291 710/110 |
| 2004/0205267 A1* | 10/2004 | Holm | G06F 13/4036 710/35 |
| 2005/0218943 A1* | 10/2005 | Padhye | G06F 13/4072 327/109 |
| 2006/0047771 A1* | 3/2006 | Blackmore | H04L 67/1097 709/209 |
| 2006/0133604 A1 | 6/2006 | Buer et al. | |
| 2007/0103193 A1 | 5/2007 | Reblewski et al. | |
| 2007/0118876 A1 | 5/2007 | Singh et al. | |
| 2007/0176631 A1 | 8/2007 | Bakker et al. | |
| 2007/0245141 A1 | 10/2007 | O'Keeffe et al. | |
| 2007/0245413 A1 | 10/2007 | Andolina et al. | |
| 2008/0098147 A1* | 4/2008 | Amano | G06F 13/4045 710/300 |
| 2008/0235415 A1* | 9/2008 | Clark | G06F 17/5031 710/105 |
| 2009/0060197 A1 | 3/2009 | Taylor et al. | |
| 2009/0119773 A1 | 5/2009 | D'Amore et al. | |
| 2009/0128186 A1 | 5/2009 | Balasubramanian et al. | |
| 2010/0077226 A1 | 3/2010 | Senga et al. | |
| 2010/0125739 A1 | 5/2010 | Creary et al. | |
| 2010/0142371 A1 | 6/2010 | Gooch et al. | |
| 2011/0106991 A1* | 5/2011 | Kawahito | G06F 13/4217 710/110 |
| 2012/0047306 A1* | 2/2012 | Mitsubayashi | G06F 13/4036 710/306 |
| 2013/0036247 A1* | 2/2013 | Jadus | G06F 13/4295 710/305 |

OTHER PUBLICATIONS

Specification and drawings for U.S. Appl. No. 14/187,143, filed Feb. 21, 2014, Ahmad et al.

Specification and drawings for U.S. Appl. No. 14/242,268, filed Apr. 1, 2014, Ahmad et al.

Altera Corp., *Cyclone V Device Handbook, vol. 3: Hard Processor System Technical Reference Manual*, Nov. 2012, pp. 1-670, Altera Corp., San Jose, California, USA.

Arm Inc., *CoreLink TrustZone Address Space Controller TZC-380*, Rev. r0p1, Sep. 10, 2008, pp. 1-82, Arm Inc., San Jose, California, USA.

General Dynamics, *Poet ACM, Programmable Objective Encryption Technologies Advanced Cryptographic Module*, copyright 2009, pp. 1-2, General Dynamics C4 Systems, Scottsdale, Arizona, USA.

General Dynamics, *Technical Requirements Document for the Programmable Objective Encryption Technologies Advanced Cryptographic Module*, Oct. 13, 2005, pp. 1-116, General Dynamics C4 Systems, Scottsdale, Arizona, USA.

McLean, Mark et al., "FPGA-Based Single Chip Cryptographic Solution (U)," *Military Embedded Systems*, Mar. 2007, pp. 34-37, OpenSystems Publishing, Saint Clair Shores, Michigan, USA.

Pereira, Fábio Dacênsio et al., "SSDR—Reconfigurable Firewall: Reconfiguration Model Impact" *Proc. of the 2008 International Conference on Information Security and Assurance*, Apr. 24, 2008, pp. 93-97, IEEE Press, Piscataway, New Jersey, USA.

Zeineddini, Amir Sheikh et al., "Secure Partial Reconfiguration of FPGAs" *Proc. of the 2005 IEEE International Conference on Field-Programmable Technology*, Dec. 11, 2005, pp. 155-162, IEEE Press, Piscataway, New Jersey, USA.

\* cited by examiner

ISOLATION INTERFACE FOR MASTER-SLAVE COMMUNICATION PROTOCOLS

TECHNICAL FIELD

The disclosure generally relates to data communications, and more particularly to communication using master-slave communication protocols.

BACKGROUND

In many applications, interface circuits are configured to communicate data between system components using a master-slave communication protocol. Read and write data transactions between the master and slave interfaces are controlled by the master interface. For ease of reference, the term data transactions may be used to refer to read and/or write data transactions. A data transaction is initiated by the master interface, in response to data and/or control signals from a first logic circuit of the system. The master interface provides a message to the slave interface using a master-slave communication protocol. The slave interface is responsible for providing the message to a second logic circuit and providing an appropriate response back to the master interface. The data transaction is completed when the response is provided from the slave interface to the master interface. If an appropriate response is not received by a master interface, the master interface may wait indefinitely for a response from the slave circuit.

In communication systems that use master-slave communication protocols, the master interface is generally unaware of the status of the slave interface. The status of the slave interface may include, for example, busy, available, power-down, reset, and/or malfunctioning. If the slave interface is in a non-responsive state, a response may not be sent to the master interface to complete the data transaction. A master interface generally has a set of limited resources to manage pending data transactions. A data transaction that is initiated but is unable to complete takes up a portion of the resources of the master interface. Eventually, deadlock may occur if sufficient resources are not available to initiate additional transactions. Deadlock may affect subsequent data transactions with other slave interfaces. For example, an unresponsive slave interface may cause deadlock and prevent the master interface from initiating data transactions with other slave interfaces.

Ideally, a master interface is designed to detect and remedy such deadlock situations. However this is not always the case. Moreover, for some master-slave communication protocols, such as the AMBA-AXI protocol, interface circuits are provided as black box circuit designs (e.g., cores) that cannot easily be modified by a designer to include such safeguard functionality. Furthermore, deadlock situations can make it difficult to debug circuit designs utilizing master-slave communication protocols. For example, a circuit design may include a number of slave interfaces, any of which could cause deadlock if it becomes unresponsive.

SUMMARY

An apparatus is disclosed for communication using a master-slave communication protocol. The apparatus includes a master circuit and a slave circuit configured to communicate with each other using a master-slave communication protocol. The apparatus also includes an interface circuit coupled to the master and slave circuits. In response to a first control signal having a first value, the interface circuit forwards messages received from the master circuit to the slave circuit and forwards responses received from the slave circuit to the master circuit. In response to the first control signal having a second value, the interface circuit prevents messages received from the master circuit from being forwarded from the master circuit to the slave circuit.

A method for communication using a master-slave communication protocol is also disclosed. An interface circuit is operated in a first mode in response to a first control signal having a first value. While operating in the first mode, the interface circuit forwards messages received from a master circuit to a slave circuit and forwards responses received from the slave circuit to the master circuit. The interface circuit is operated in a second mode in response to the first control signal having a second value. While operating in the second mode, the interface circuit prevents messages from being forwarded from the master circuit to the slave circuit.

Other features will be recognized from consideration of the Detailed Description and Claims, which follow.

BRIEF DESCRIPTION OF THE DRAWINGS

Various aspects and features of the invention will become apparent upon review of the following detailed description and upon reference to the drawings, in which.

DETAILED DESCRIPTION

The present disclosure describes circuits and methods that prevent deadlock from occurring by isolating master and slave interfaces from each other using an isolation interface coupled between the master and slave interfaces. The isolation interface forwards messages and responses between master and slave interfaces and is configured to prevent deadlock when a slave interface is disabled or is otherwise unresponsive. For example, the isolation interface may be configured to provide an interrupt, error signal and/or warning message to the master interface or other logic circuit in response to a slave interface becoming unresponsive.

In some implementations, the isolation interface circuit is configured to isolate/connect master and slave interfaces in response to an isolation enable signal. While an isolation enable signal has a first value (e.g., logic 0), the isolation interface 120 operates in a transparent mode in which messages and responses are passed between the master and slave interfaces with no additional latency. When the enable signal has a second value (e.g., logic 1), the isolation interface is configured to isolate the master interface from the slave interface.

The isolation interface circuit may be used to facilitate disabling of a slave interface by isolating master and slave interfaces prior to disabling of the slave circuit. For instance, a power control circuit may disable a slave interface, and a circuit(s) connected thereto, to reduce energy consumption in a power saving mode of operation. Before powering down the slave interface, the power control circuit may set the isolation enable signal to prompt the isolation interface to isolate the master and slave circuits. To achieve isolation, the isolation interface forwards responses from the slave interface to complete any data transactions that are pending and prevents new data transactions from being initiated. Once pending data transactions are completed, the isolation interface responds to new messages without involvement of the slave interface and sets a status signal to a value to indicate to the power control circuit that the slave interface may be disabled. Because new data transactions with the slave interface are prevented and transactions targeting the isolated slave interface are responded to by the isolation circuit, deadlock will not occur when the slave interface becomes disabled.

Figure 1:
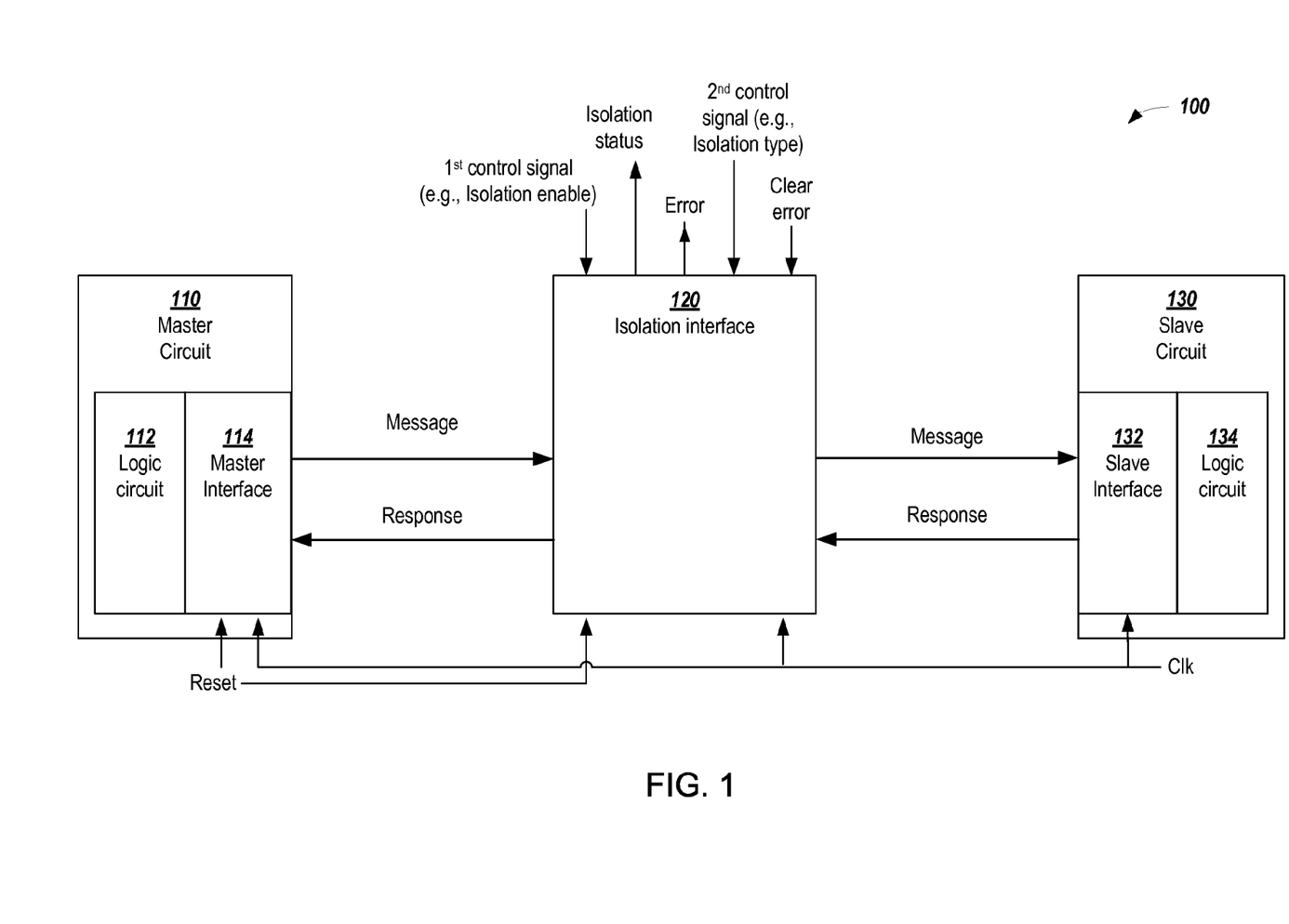
FIG. 1 shows a system for communication between two interface circuits using a master-slave communication protocol.

Turning to the figures, FIG. 1 shows an exemplary system for communication using a master-slave communication protocol. The system 100 includes a master circuit 110 and a slave circuit 130 having respective master and slave interfaces 114 and 132 for communication using the master-slave communication protocol. In this example, the master and slave circuits 110 and 130 are synchronized and/or reset by global clock (Clk) and reset signals. The master and slave interfaces 114 and 132 are communicatively connected by an isolation interface 120.

Data transactions are initiated by the master interface 114 in response to data and/or commands provided by a logic circuit 112 of the master circuit 110. The master interface 114 initiates a data transaction by allocating resources for the data transaction and transmitting a message to the slave interface, via the isolation interface. Resources may include, for example, memory resources to track the status of the data transaction. The slave interface 132 provides a received message to logic circuit 134 of the slave circuit 130. The slave interface 132 also transmits responses to the master interface 114 via the isolation interface 120. To complete the data transaction, the master interface 114 provides the response to the logic circuit 112 of the master circuit 110 and releases resources allocated for the data transaction. The isolation interface circuit prevents deadlock by isolating the master and slave interfaces, for example, in response to a control signal or the slave becoming unresponsive.

In some implementations, the isolation interface 120 is configured to isolate master and slave interfaces 114 and 132 from each other in response to an enable signal. While the isolation enable signal is set to logic 0, the isolation interface 120 operates in a transparent mode, in which messages and responses are passed between the master and slave interfaces 114 and 132. When the enable signal is set to logic 1, the isolation interface operates in an isolation mode, in which the master interface 114 is isolated from the slave interface 132. To achieve isolation, the isolation interface 120 forwards responses from the slave interface 132 to the master interface 114 for any data transactions that are pending and prevents new data transactions from being initiated by the master interface 114. Isolation is achieved when, all pending data transactions, including either read and/or write data transactions, have completed. Once isolation is achieved, the master interface can generate read/write transactions, which will be responded by the isolation interface without participation of the slave interface.

Additionally or alternatively, in some implementations, the isolation interface 120 is configured to prevent new data transactions from being initiated and/or isolate the master and slave interfaces 114 and 132 from each other in response to the slave interface 132 becoming unresponsive. For example, the isolation interface 120 may detect an unresponsive slave interface 132 by maintaining a timeout counter for a message forwarded to the slave interface 132. If the timeout expires before a response is received from the slave interface 132, the slave interface 132 is considered to be unresponsive. In response to the slave interface 132 becoming unresponsive, the isolation interface 120 may isolate the master and slave interfaces 114 and 132 or otherwise prevent new data transactions from being initiated until isolation is achieved. Once Isolation is achieved, the master interface can generate read/write transactions which will be responded by the isolation interface.

The isolation interface 120 may prevent new data transactions from being initiated in a number of ways. For example, in response to receiving a message from the master interface 114, the isolation interface 120 may prevent the message from being forwarded to the slave interface 132. The isolation interface 120 may also send a response to the master interface 114 to prompt the master interface to stop sending messages to the slave interface 132. Alternatively or additionally, the isolation interface 120 may indirectly prompt the master interface 114 to stop sending messages to the slave interface 132 by generating an error signal. In response to the error signal, a control circuit (not shown in FIG. 1) may prompt the master interface 114 to stop sending messages to the slave interface 132, for example, by generating a processor interrupt signal. In some implementations, the error signal is maintained until the error is cleared by a clear error control signal. In some implementations, the method in which the isolation interface responds to new data transactions may be selected by a selection signal (isolation type).

Figure 2:
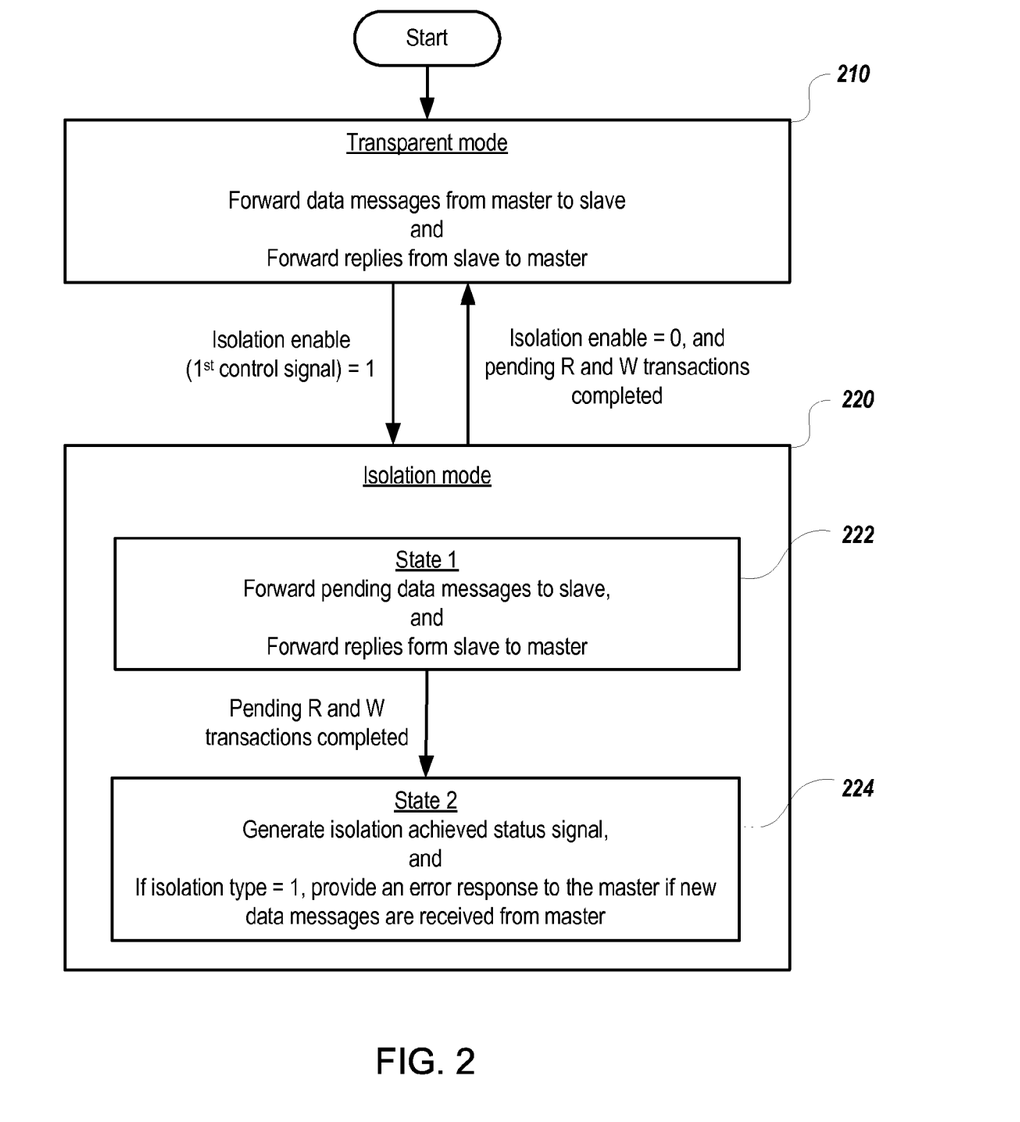
FIG. 2 shows a flowchart for communication between master and slave interface circuits.

FIG. 2 shows a flowchart for communication between two master and slave interface circuits connected by an isolation interface. In this example, the isolation interface initially operates in a transparent mode at block 210. While operating in the transparent mode, messages received by the isolation interface from the master interface are forwarded to the slave interface and responses received from the slave interface are forwarded to the master interface. The interface operates in the transparent mode while an isolation enable signal is set to logic 0. In response to the isolation enable being set to logic 1, the isolation interface begins operating in an isolation mode at block 220. The isolation enable signal may be set by a power control circuit in preparation for powering down the slave interface, for example.

While operating in the isolation mode at block 220, the isolation interface forwards responses from the slave interface to the master interface so the slave interface may complete any data transactions that are pending. Also while operating in the isolation mode at block 220, the isolation interface prevents new data transactions from being initiated. When the isolation mode is entered, the isolation interface initially operates in a first isolation state at block 222 until isolation is achieved. Isolation is achieved once pending data transactions have completed. While operating in the first isolation state at block 222, responses are provided from the slave interface to the master interface so pending data transactions, initiated while operating in the transparent mode, may be completed. Isolation is achieved once a respective reply is received and forwarded to the master interface for each of the pending read and write data transactions.

The isolation interface prevents new data transactions from being initiated while operating in the first state at block 222 of the isolation mode until isolation has been achieved. As described with reference to FIG. 1, the isolation interface may prevent new data transactions from being initiated in a number of ways. For example, in response to receiving a message from the master interface, the isolation interface may prevent the message from being forwarded to the slave interface. The isolation interface may also generate a response, error signal, and/or interrupt to prompt the master interface to stop initiating new data transactions. In some implementations, the manner in which new data transactions are prevented is selected by a selection control signal (isolation type). For instance, in one implementation, in response to receiving a message in the second isolation state at block 224, an error message is generated if the isolation type is equal to logic 1 and no error message is generated if the isolation type is equal to logic 0.

Once isolation is achieved, the interface enters a second isolation state at block 224. Upon entering the second state at block 224, a status signal is set to a value indicating that isolation has been achieved. The status signal may be used, for example, as a trigger to power down the slave circuit after isolation has been achieved. While operating in the second isolation state at block 224 no messages or responses are communicated between the master and slave circuits—thereby isolating the master and slave interfaces from each other.

In response to isolation enable being set to logic 0 while operating in the isolation mode at block 220, the interface circuit again operates in the transparent mode at block 210. In the example shown in FIG. 2, the interface circuit transitions back to the transparent mode at block 210 after pending data transactions have completed. More specifically, if the isolation interface is in the first isolation state at block 222 when isolation enable is set to logic 0, the isolation interface may immediately begin operating in the transparent mode at block 210. Otherwise, the isolation interface will continue operating in the isolation mode at block 220 until any pending read and write transactions have completed.

Figure 3:
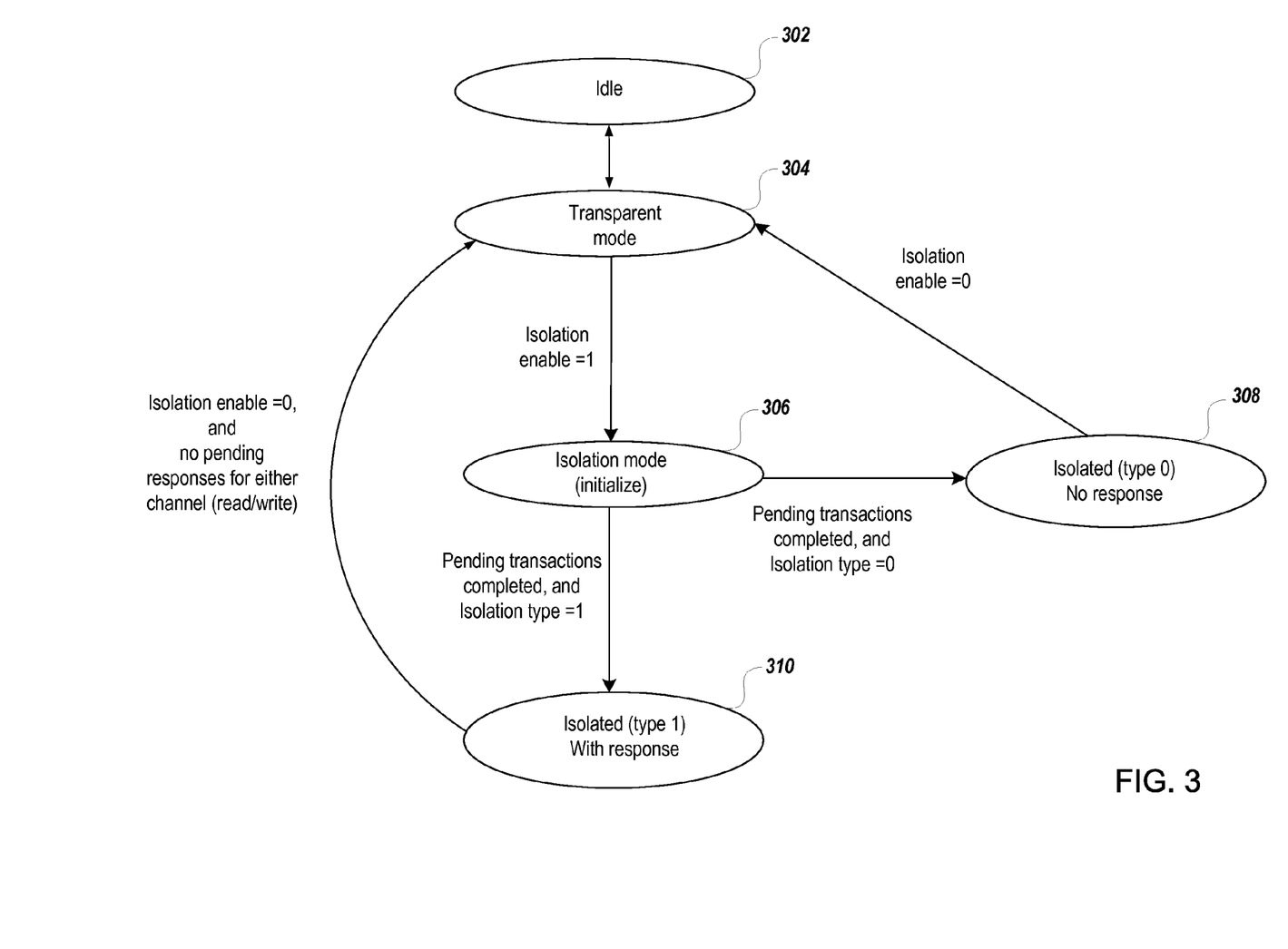
FIG. 3 shows a state machine for operating an isolation interface for communication between master and slave interface circuits.

FIG. 3 shows a state machine for operating an isolation interface for communication between master and slave interface circuits. The isolation interface operates in an idle state 302 when no data transactions have been initiated for a threshold time period. In response to a data transaction being initiated in the idle state, the isolation interface begins operating in a transparent mode at state 304, as described with reference to 210 in FIG. 2. The isolation interface continues operating in state 304 while data transactions continue to be initiated and the isolation enable signal is set to logic 0. In response to the isolation enable signal being set to logic 1, the isolation interface transitions to a first isolation state 306. As described with reference to 222 in FIG. 2, while operating in the first isolation state 306, the isolation interface prevents new data transactions from being initiated. The isolation interface also provides responses from the slave interface to the master interface so pending data transactions may be completed. Once all pending data transactions have completed, the isolation interface transitions to a second isolation state 308 or 310, in which no messages or responses are forwarded between the master and slave interfaces.

While operating in the second isolation state 308 or 310, the isolation interface may respond to new data messages in a number of ways. In this example, the manner in which the isolation interface responds to new messages is selected by a selection signal (isolation type). If the isolation type signal is logic 1 when pending data transactions are completed in state 306, the isolation interface transitions to state 310. While operating in state 310, the isolation interface responds to new messages by providing an error response to the master interface. In contrast, if the isolation type signal is logic 0 when pending data transactions are completed in state 306, the isolation interface transitions to state 308. While operating in state 308, the isolation interface does not provide a response to the master interface when a new message is received. In response to the enable signal being reset to logic 0 while in isolated states 308 or 310, the isolation interface transitions back to the state 304, for operation in the transparent mode, after pending responses have been transmitted for either read or write data transactions.

Figure 4:
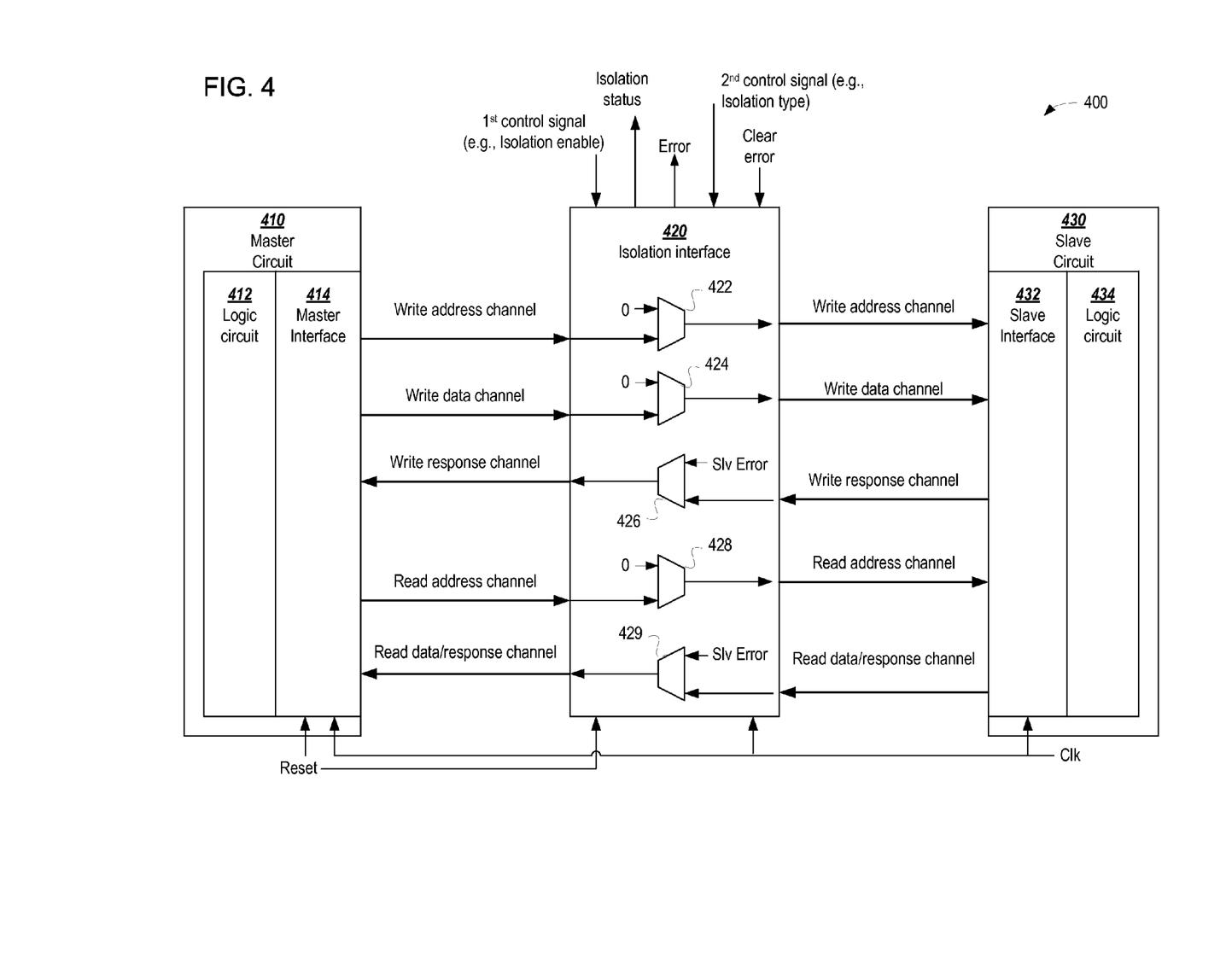
FIG. 4 shows a system for communication between master and slave interface circuits using the AMBA-AXI communication protocol.

The circuits and methods discussed herein may be applied to use a number of master-slave communication protocols including, but not limited to, AMBA-AXI, AMBA-APB, Serial peripheral interface (PSI) bus, universal serial bus (USB), UART, and/or Bluetooth. As a specific example, FIG. 4 shows a system 400 for communication between master and slave interface circuits using the AMBA-AXI communication protocol.

The system 400 includes a master circuit 410 and a slave circuit 430 having respective logic circuits 412 and 434 and respective master and slave interfaces 414 and 432. In this example, master and slave interfaces 414 and 432 are configured to communicate data between the logic circuits using the AMBA-AXI communication protocol. Write data transactions are initiated by the master interface 414 using a write address channel to indicate which address of the slave circuit 430 should be written to. A write data channel is used to communicate the data to be written. Responses indicating whether or not the write transaction successfully completed are communicated from the slave interface 432 using a write response channel. Read data transactions are initiated by the master interface 414 using a read address channel to request data from a particular address of the slave circuit 430. Requested data and other responses are provided to the master interface 414 using a read data/response channel.

The isolation interface 420 operates in response to isolation enable, isolation type, and/or clear error signals as described with reference to 120 in FIG. 1. While an isolation enable signal is set to logic 0, the isolation interface 420 operates in a transparent mode in which messages and responses are forwarded between master and slave interfaces 414 and 432. When the enable signal is set to logic 1, the isolation interface 420 operates in an isolation mode, in which the master interface is isolated from the slave interface. To achieve isolation, the isolation interface forwards messages and responses between master and slave interfaces 414 and 432 for any pending data transactions and prevents new data transactions from being initiated. Once isolation is achieved, the isolation interface sets the isolation status signal to logic 1. If new data transactions are initiated while operating in the isolation mode, or if the slave interface becomes unresponsive, the isolation interface will respond to the transaction and an error signal is output by the isolation interface. The error signal is reset to logic 0 in response to a clear error control signal.

For each of the communication channels, the isolation interface 420 includes a respective selection circuit 422, 424, 426, 428, or 429 that is configurable to either connect or isolate the master and slave interfaces 414 and 432. The selection circuit may be, for example, multiplexors having respective selection control inputs driven by the isolation enable signal. Selection circuits 422, 424, and 428, are configured to either provide data on the respective channel from the master interface 414 to the slave interface 432 or set the communication channel to logic 0 on the slave interface side 432—thereby isolating the master and slave interfaces 414 and 432. Selection circuits 426 and 429 are configured to either provide responses from the slave interface 432 to the master interface 414 or provide error signals (if applicable) from the isolation interface 420 to the master interface 414.

Figure 5:
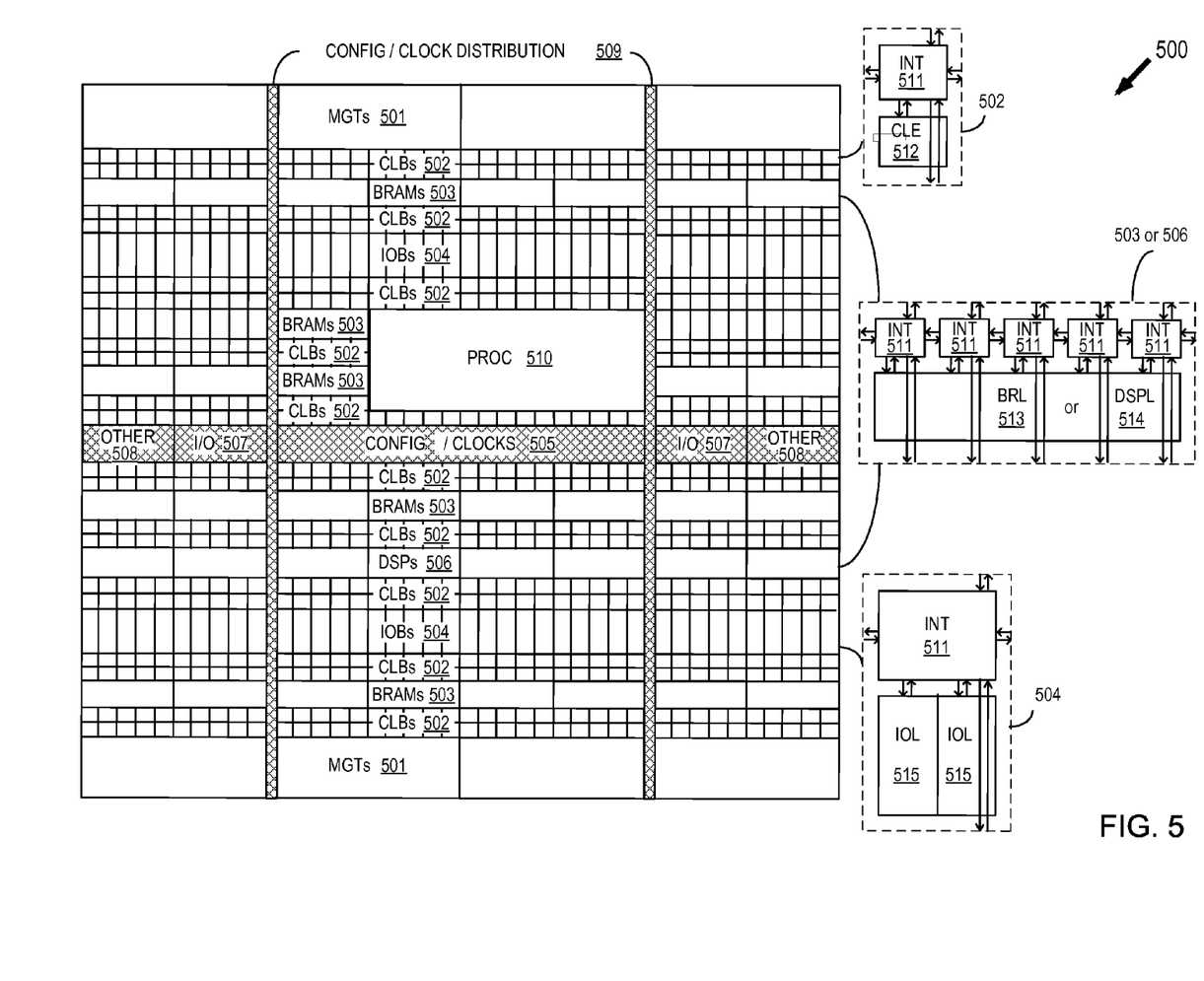
FIG. 5 shows a detailed block diagram of an example programmable integrated circuit that may be configured to implement an isolation interface for communication using a master-slave communication protocol.

FIG. 5 is a block diagram of an example programmable integrated circuit (IC) that may utilize an isolation interface to communicate data between different circuits using a master-slave communication protocol. However, the interface structures and methods described herein may also be implemented by other ICs or circuits. The programmable IC shown in FIG. 5 is a field programmable gate array (FPGA). FPGAs can include several different types of programmable logic blocks in the array. For example, FIG. 5 illustrates an FPGA architecture (500) that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507), for example, e.g., clock ports, and other programmable logic 508 such as digital clock managers, analog-to-digital converters, system monitoring logic, and so forth. Some FPGAs also include dedicated processor blocks (PROC 510) and internal and external reconfiguration ports (not shown).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element INT 511. A BRAM 503 can include a BRAM logic element (BRL 513) in addition to one or more programmable interconnect elements. Typically, the number of interconnect elements included in a tile depends on the width of the tile. In the pictured FPGA, a BRAM tile has the same width as five CLBs, but other numbers (e.g., four) can also be used. A DSP tile 506 can include a DSP logic element (DSPL 514) in addition to an appropriate number of programmable interconnect elements. An 10B 504 can include, for example, two instances of an input/output logic element (IOL 515) in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured FPGA, a horizontal area near the center of the die (shown shaded in FIG. 5) is used for configuration, clock, and other control logic. Vertical areas 509 extending from this horizontal area are used to distribute the clocks and configuration signals across the breadth of the FPGA.

Some FPGAs utilizing the architecture illustrated in FIG. 5 include additional logic blocks that disrupt the regular row structure making up a large part of the FPGA. The additional logic blocks can be programmable blocks and/or dedicated logic. For example, the processor block PROC 510 shown in FIG. 5 spans several rows of CLBs and BRAMs.

Note that FIG. 5 is intended to illustrate only an exemplary FPGA architecture. The numbers of logic blocks in a row, the relative heights of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

The methods and circuits are thought to be applicable to a variety of systems that utilize master-slave communication protocols for communication. Other aspects and features will be apparent to those skilled in the art from consideration of the specification. For instance, although aspects and features may in some cases be described in individual figures, features from one figure can be combined with features of another figure even though the combination is not explicitly shown or explicitly described as a combination. The methods and circuits may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. An apparatus, comprising:
   a master circuit configured and arranged to communicate using a master-slave communication protocol;
   a slave circuit configured and arranged to communicate with the master circuit using the master-slave communication protocol; and
   an interface circuit coupled to the master and slave circuits and configured and arranged to:
      in response to a first value of a first control signal and any value of a second control signal that indicates an isolation type:
         forward messages received from the master circuit to the slave circuit; and
         forward responses received from the slave circuit to the master circuit;
      in response to a second value of the first control signal and a first value of the second control signal:
         prevent messages received from the master circuit from being forwarded from the master circuit to the slave circuit;
         provide an error response to the master circuit for messages received from the master circuit; and
      in response to the second value of the first control signal and a second value of the second control signal:

prevent messages from being forwarded from the master circuit to the slave circuit; and
provide no error response to the master circuit.

2. The apparatus of claim 1, wherein the interface circuit is further configured and arranged to, in response to the first control signal having the second value and forwarding the responses from the slave circuit for each previously received message:
generate a response for a message received from the master circuit without participation of the slave circuit; and
transmit the generated response to the master circuit.

3. The apparatus of claim 1, wherein the interface circuit is further configured and arranged to:
in response to the first control signal changing from the first value to the second value,
forward the response from the slave circuit to the master circuit for each message received prior to the first control signal changing from the first value to the second value, and
generate a status signal to the master circuit once a response is forwarded for each message received prior to the first control signal changing from the first value to the second value.

4. The apparatus of claim 3, further comprising a control circuit configured and arranged to power down the slave circuit in response to the status signal.

5. The apparatus of claim 1, wherein the interface circuit is further configured and arranged to generate an error signal in response to receiving a message from the master circuit while the first control signal has the second value.

6. The apparatus of claim 5, further comprising a control circuit configured and arranged to generate a processor interrupt in response to the error signal.

7. The apparatus of claim 1, wherein the interface circuit is configured and arranged to request the master circuit to stop sending messages to the slave circuit in response to the first control signal having the second value.

8. The apparatus of claim 1, wherein the interface circuit is further configured and arranged to generate an error signal in response to the first control signal having the first value and the slave circuit not providing a response to a respective one of the forwarded messages within an expected timeframe.

9. The apparatus of claim 2, wherein the interface circuit further includes a first multiplexor having a first input coupled to receive messages from the master circuit, a second input coupled to a reference voltage, a selection control input coupled to the first control signal, and an output coupled to the slave circuit.

10. The apparatus of claim 9, wherein the interface circuit further includes a second multiplexor having a first input coupled to receive responses from the slave circuit, a second input coupled to receive the response generated by the interface circuit, a selection control input coupled to the first control signal, and an output coupled to the master circuit.

11. A method, comprising:
operating an interface circuit in a first mode in response to a first value of a first control signal, and while operating in the first mode and for any value of a second control signal that indicates an isolation type:
forwarding messages received from a master circuit to a slave circuit; and
forwarding responses received from the slave circuit to the master circuit; and
operating the interface circuit in a second mode in response to a second value of the first control signal, and while operating in the second mode:
in response to a first value of the second control signal:
preventing messages from being forwarded from the master circuit to the slave circuit; and
providing an error response to the master circuit for messages received from the master circuit; and
in response to a second value of the second control signal:
preventing messages from being forwarded from the master circuit to the slave circuit; and
providing no error response to the master circuit.

12. The method of claim 11, further comprising, in response to forwarding the responses from the slave circuit for each of the previously received messages from the master circuit:
for a message received from the master circuit, generating a response without participation of the slave circuit; and
transmitting the generated response to the master circuit.

13. The method of claim 11, further comprising:
in response to the first control signal changing from the first value to the second value,
forwarding the response from the slave circuit to the master circuit for each message received from the master circuit prior to the first control signal changing from the first value to the second value, and
generating a status signal to the master circuit once a response is forwarded for each message received prior to the first control signal changing from the first value to the second value.

14. The method of claim 13, further comprising powering down the slave circuit in response to the status signal.

15. The method of claim 11, further comprising generating an error signal at the interface circuit in response to receiving a message from the master circuit while operating in the second mode.

16. The method of claim 15, further comprising:
providing the error signal to a control circuit; and
at the control circuit, generating a processor interrupt in response to the error signal.

17. The method of claim 11, further comprising, in response to the first control signal having the second value, sending a request to the master circuit to stop sending messages to the slave circuit.

18. The method of claim 11, further comprising, while operating in the first mode, generating an error signal in response to forwarding a message from the master circuit to the slave circuit and the slave circuit not providing a corresponding response thereto within an expected timeframe.

* * * * *